United States Patent
Ohara

(10) Patent No.: US 8,830,504 B2
(45) Date of Patent: Sep. 9, 2014

(54) TERMINAL DEVICE THAT SELECTIVELY DISPLAYS IDENTIFICATION INFORMATION DESIGNATION SCREENS

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 687 days.

(21) Appl. No.: 13/071,034

(22) Filed: Mar. 24, 2011

(65) Prior Publication Data

US 2011/0242598 A1 Oct. 6, 2011

(30) Foreign Application Priority Data

Mar. 30, 2010 (JP) ................................ 2010-077443

(51) Int. Cl.
G06F 3/12 (2006.01)

(52) U.S. Cl.
CPC ............ *G06F 3/1288* (2013.01); *G06F 3/1247* (2013.01); *G06F 3/1228* (2013.01); *G06F 3/1232* (2013.01); *G06F 3/1205* (2013.01)
USPC ....................................................... 358/1.15

(58) Field of Classification Search
CPC ... G06F 3/1205; G06F 3/1228; G06F 3/1232; G06F 3/1247; G06F 3/1288
USPC ....................................................... 358/1.15
See application file for complete search history.

(56) References Cited

U.S. PATENT DOCUMENTS

| | | | |
|---|---|---|---|
| 5,995,722 A | 11/1999 | Kishida | |
| 2002/0024686 A1 | 2/2002 | Uchiyama et al. | |
| 2002/0120742 A1 | 8/2002 | Cherry | |
| 2002/0156947 A1* | 10/2002 | Nishio | ............................. 710/36 |
| 2003/0002077 A1* | 1/2003 | Shima | ........................... 358/1.15 |
| 2004/0054962 A1* | 3/2004 | Shima et al. | ................... 715/500 |

(Continued)

FOREIGN PATENT DOCUMENTS

| | | |
|---|---|---|
| CN | 1340768 A | 3/2002 |
| EP | 1973031 A1 | 9/2008 |

(Continued)

OTHER PUBLICATIONS

State Intellectual Property Office of the People's Republic of China, Notification of First Office Action for Chinese Patent Application No. 201110082426.2, mailed May 16, 2013.

(Continued)

*Primary Examiner* — Benny Q Tieu
*Assistant Examiner* — Quyen V Ngo
(74) *Attorney, Agent, or Firm* — Baker Botts L.L.P.

(57) ABSTRACT

A computer readable device storing instructions configured to be executed by a control unit of a terminal device, the instructions, when executed by the control unit, may cause the control unit to function as a display controlling module, an identification information acquiring module and a supplying module. The display controlling module may be configured to cause, upon a user's first operation on a first file prepared for an application software installed in the terminal device, a display device to display an identification information designation screen for designating printer identification information so as to identify a printer to perform printing for the first file. The identification information acquiring module may be configured to acquire the printer identification information designated via the identification information designation screen. The supplying module may be configured to supply the printer identification information and first target data for the first file to a server.

14 Claims, 4 Drawing Sheets

(56) References Cited

U.S. PATENT DOCUMENTS

| | | |
|---|---|---|
| 2006/0028679 A1 | 2/2006 | Uchiyama et al. |
| 2006/0028680 A1 | 2/2006 | Uchiyama et al. |
| 2007/0008567 A1 | 1/2007 | Choi |
| 2009/0201547 A1 | 8/2009 | Noguchi et al. |
| 2009/0225366 A1* | 9/2009 | Emori .......................... 358/1.15 |
| 2009/0262203 A1* | 10/2009 | Hitaka ....................... 348/207.2 |

FOREIGN PATENT DOCUMENTS

| | | |
|---|---|---|
| JP | H08-230285 A | 9/1996 |
| JP | 2001-034433 A | 2/2001 |
| JP | 2002-073462 | 3/2002 |
| JP | 2002-318677 A | 10/2002 |
| JP | 2004-046304 A | 2/2004 |
| JP | 2008-134885 A | 6/2008 |
| JP | 2009-193163 A | 8/2009 |

OTHER PUBLICATIONS

Japan Patent Office, Notification of Reasons for Rejection for Japanese Patent Application No. 2010-077443 (counterpart Japanese patent application), mailed Jul. 10, 2012.

European Patent Office, extended European Search Report for European Patent Application No. 11159871.0 (counterpart European patent application), dated May 3, 2013.

* cited by examiner

TERMINAL DEVICE THAT SELECTIVELY DISPLAYS IDENTIFICATION INFORMATION DESIGNATION SCREENS

CROSS-REFERENCE TO RELATED APPLICATIONS

This application claims priority to Japanese Patent Application No. 2010-077443, filed on Mar. 30, 2010, the contents of which are hereby incorporated by reference into the present application.

TECHNICAL FIELD

The present specification discloses a terminal device configured to connect with a server.

DESCRIPTION OF RELATED ART

There is a conventional art in which a user designates an IP address of a specific printer and a specific content for causing the specific printer to perform print via a specific screen displayed on a displaying unit of a terminal device. The terminal device sends the IP address of the specific printer and the specific content to a print server. The print server converts the specific content into print data having a format that the specific printer is capable of interpreting. The printer server sends the print data to the specific printer. The specific printer performs printing in accordance with the print data. According to the conventional art described above, the terminal device can cause the specific printer to perform printing without installing a printer driver in the terminal device for converting a print object content into print data

SUMMARY

A user may desire to print a file designated in accordance with an application program (e.g., word-processing software, spreadsheet software, and mailer software of e-mails) installed on a terminal device (e.g., a file performed in accordance with the application program). For example, a known application program causes a screen presenting data included in a print target file to be displayed, causes a menu screen including a print button to be displayed on the screen, and enables the user to operate the print button. Therefore, the user accustomed to using the known application program normally desires printing of the print target file designated in accordance with the application program to be performed when an operation in accordance with the same application program (in the example described above, the operation of the print button) is performed.

In the conventional art, the print target content selected via the specific screen of the terminal device is a content outside of the terminal device and is not a content designated in accordance with the application program installed in the terminal device. That is, with the conventional art, no consideration is given to causing a printer to perform printing of a file designated in accordance with the application program in the terminal device.

The present specification discloses an art for performing printing of a print target file without installing a driver program in a terminal device for generating a print data to be processed by a printer. In particular, an art is provided which enables a user to perform, on a print target file designated in accordance with an application program of the terminal device, an operation for print in accordance with the same application program.

The art disclosed in the present specification is a computer readable device. The computer readable device may store instructions configured to be executed by a control unit of a terminal device. The instructions, when executed by the control unit, may cause the control unit to function as a display controlling module, an identification information acquiring module and a supplying module. The display controlling module may be configured to cause, upon a user's first operation on a first file prepared for an application software installed in the terminal device, a display device to display an identification information designation screen for designating printer identification information so as to identify a printer to perform printing for the first file. The identification information acquiring module may be configured to acquire the printer identification information designated via the identification information designation screen. The supplying module may be configured to supply the printer identification information and first target data for the first file to a server.

Moreover, a method, a computer program, and a non-transitory computer readable medium storing the computer program for realizing the terminal device are also novel and useful. A storage unit may be a non-transitory medium, such as static memory, non-volatile memory, volatile memory, a CD, a DVD, a hard drive, a flash drive and so on. Furthermore, the terminal device comprising the controlling device and a network system comprising the terminal device, the server and the printer is novel and useful.

EMBODIMENT

Figure 1:
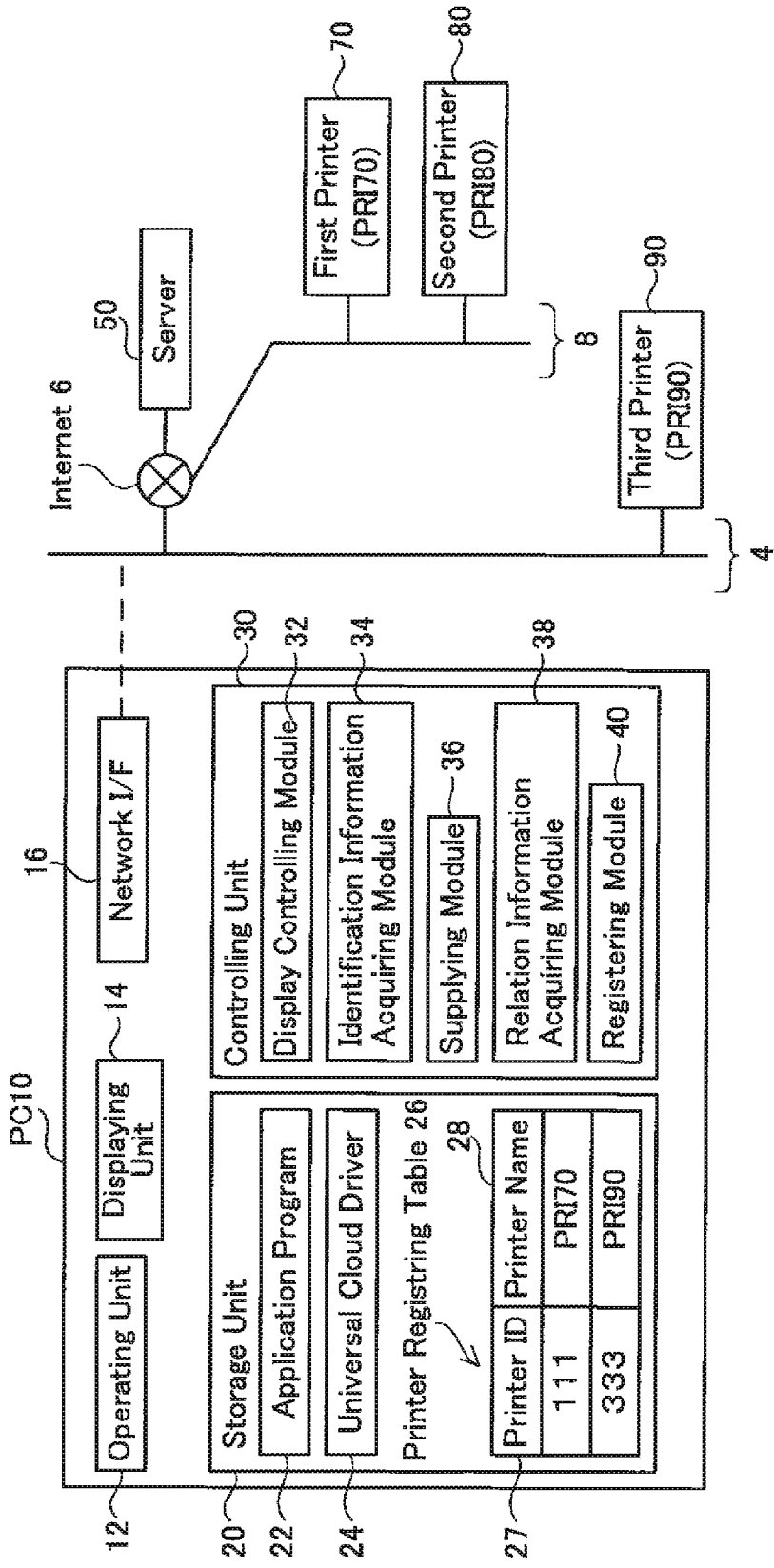
FIG. 1 illustrates a configuration of a network system.

An embodiment will now be described with reference to the drawings. As illustrated in FIG. 1, a network system 2 comprises a PC 10, a server 50, and a plurality of printers 70, 80, and 90. The PC 10 may be portable. The PC 10 is temporarily connected to a LAN 4. The PC 10 may be connected to the Internet 6 via the LAN 4. The server 50 is connected to the Internet 6. That is, the PC 10 is connected to and is capable of communicating with the server 50 via the LAN 4 and the Internet 6. The first printer 70 and the second printer 80 are connected to a LAN 8 different from the LAN 4. The first printer 70 and the second printer 80 are connected to and are capable of communicating with the server 50 via the LAN 8 and the Internet 6. The third printer 90 is connected to the LAN 4. The third printer 90 is connected to and is capable of communicating with the server 50 via the LAN 4 and the Internet 6. Moreover, "PRI70", "PRI80", and "PRI90" respectively indicated in the printers 70 to 90 are printer names such as node names of the respective printers 70 to 90.

(Function of Server)

Figure 6:
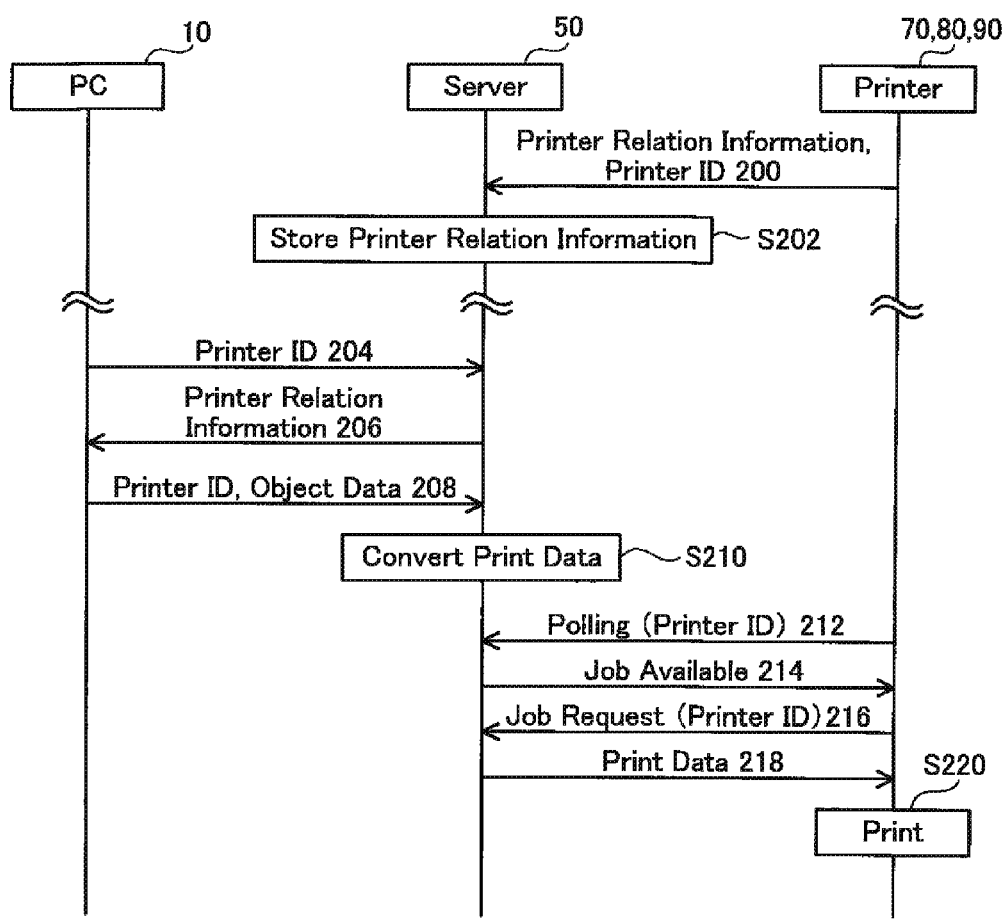
FIG. 6 illustrates a sequence diagram of processes performed by respective devices in the network system.

As illustrated in FIG. 6, from each of the first to third printers 70 to 90, the server 50 acquires printer relation information and a printer ID 200 for each printer. The printer relation information includes model information such as model name of the printer, printer name information such as node name information, and location information. The server 50 includes a printer driver for each printer model, and by acquiring printer model information from each of the first to third printers 70 to 90, the server 50 is able to determine data format information related to a data format which can be interpreted by each printer. For each of the first to third printers 70 to 90, the server 50 associates the various types of information (e.g., printer relation information, printer ID, and data format information) acquired from each printer and stores the associated information in a memory in the server 50 (S202). Moreover, when power is turned on or when printer relation information is modified, each of the printers 70 to 90 supply the printer ID and modified printer relation information to the server 50. Then, the server 50 updates the aforementioned various types of information of each printer 70 to 90 in the server 50.

(Configuration of PC)

The PC 10 comprises an operating unit 12, a displaying unit 14, a network interface 16, a storage unit 20, and a controlling unit 30. The operating unit 12 includes a keyboard and a mouse. The displaying unit 14 is for displaying various information. The network interface 16 is used by the PC 10 to establish a wired or wireless connection to the LAN 4. The controlling unit 30 performs various processes in accordance with an application program 22 and a universal cloud driver 24 stored in the storage unit 20. A display controlling module 32, an identification information acquiring module 34, a supplying module 36, a relation information acquiring module 38, and a registering module 40 are functioned as a result of the controlling unit 30 performing processes in accordance with the universal cloud driver 24.

The storage unit 20 stores the application program 22 and the universal cloud driver 24 to be performed by the controlling unit 30. The user may install the application program 22 and the universal cloud driver 24 in the PC 10. The universal cloud driver 24 may be installed on the PC 10 from a computer readable medium storing the universal cloud driver 24 or from a driver distribution server on the Internet 6. In another embodiment, a manufacturer or a provider of the PC 10 may pre-install the universal cloud driver 24 in the PC 10. Moreover, methods such as installation from the non-transitory computer readable medium or the Internet and installation by the manufacturer or the provider of the PC 10 may similarly be used for the application program 22.

The universal cloud driver 24 is a driver for converting the print target file (e.g., print object file) into target data (e.g., object data) such as EMF data (Enhanced Metafile Format data) having a format such that the server 50 is capable of interpreting the converted target data. The server 50 converts the target data generated by the universal cloud driver 24 into final print data having a format such that a printer is capable of interpreting the final print data. That is, the universal cloud driver 24 is not a driver unique to a printer of a specific model, but rather a universal driver which can be used for printing to be performed on printers of various models. The PC 10 supplies the converted target data to the server 50. Then the server 50 converts the target data into print data having the format such that the target printer is capable of interpreting the print data. While a detailed description will be given later, when a new printer ID 27 and a printer name 28 are associated with each other and registered in a printer registering table 26, the controlling unit 30 generates a dedicated cloud driver for the registered printer in accordance with the universal cloud driver 24. In the present embodiment, the storage unit 20 stores a certain cloud driver for the printer PRI70 and a certain cloud driver for the printer PRI90 in addition to the universal cloud driver 24.

The application program 22 is known application software. For example, the application program 22 may be text editing software such as word-processing software and spreadsheet software. Alternatively, for example, the application program 22 may be mailer software for e-mails.

The storage unit 20 also stores the printer registering table 26. The printer ID 27 and the printer name 28 are associated with each other and registered in the printer registering table 26. In the present embodiment, the printer ID 27 and the printer name 28 are associated with each other and registered in the printer registering table 26 for each of the first printer 70 and the third printer 90.

(Processes Performed by PC)

Next, processes performed by the controlling unit 30 of the PC 10 will be described with reference to FIG. 2. The controlling unit 30 initiates the processes illustrated in FIG. 2 when an operation for activating the application program 22 is performed by the user on the operating unit 12. The controlling unit 30 activates the application program 22 (S12). The user may operate the application program 22 and then a file may be displayed in the display unit 14. In the example illustrated in FIG. 3, a screen 100 represented by a file having a file name "AAA" is displayed on the displaying unit 14. In the following description, the file with the file name "AAA" will be referred to as the "file AAA". The screen 100 includes a display field 100a for displaying contents of data of the file AAA and an instruction input field 100b for inputting instructions to perform various commands in accordance with the application program 22. The user can edit data of the file AAA displayed in the display field 100a by operating the operating unit 12 in accordance with the application program 22.

By further operating the operating unit 12, the user can perform a menu selection operation for selecting a "file" menu 102 in the instruction input field 100b. When the "file" menu 102 is selected by the user, the controlling unit 30 causes the displaying unit 14 to display a menu selection screen 103 in accordance with the application program 22. By operating the operating unit 12, the user can select one of a plurality of items displayed in the menu selection screen 103. Then, the user can perform an item selection operation for selecting a [print] button 104 displayed in the menu selection screen 103. A combination of the menu selection operation and the item selection operation will be referred to as a "print start operation".

Figure 2:
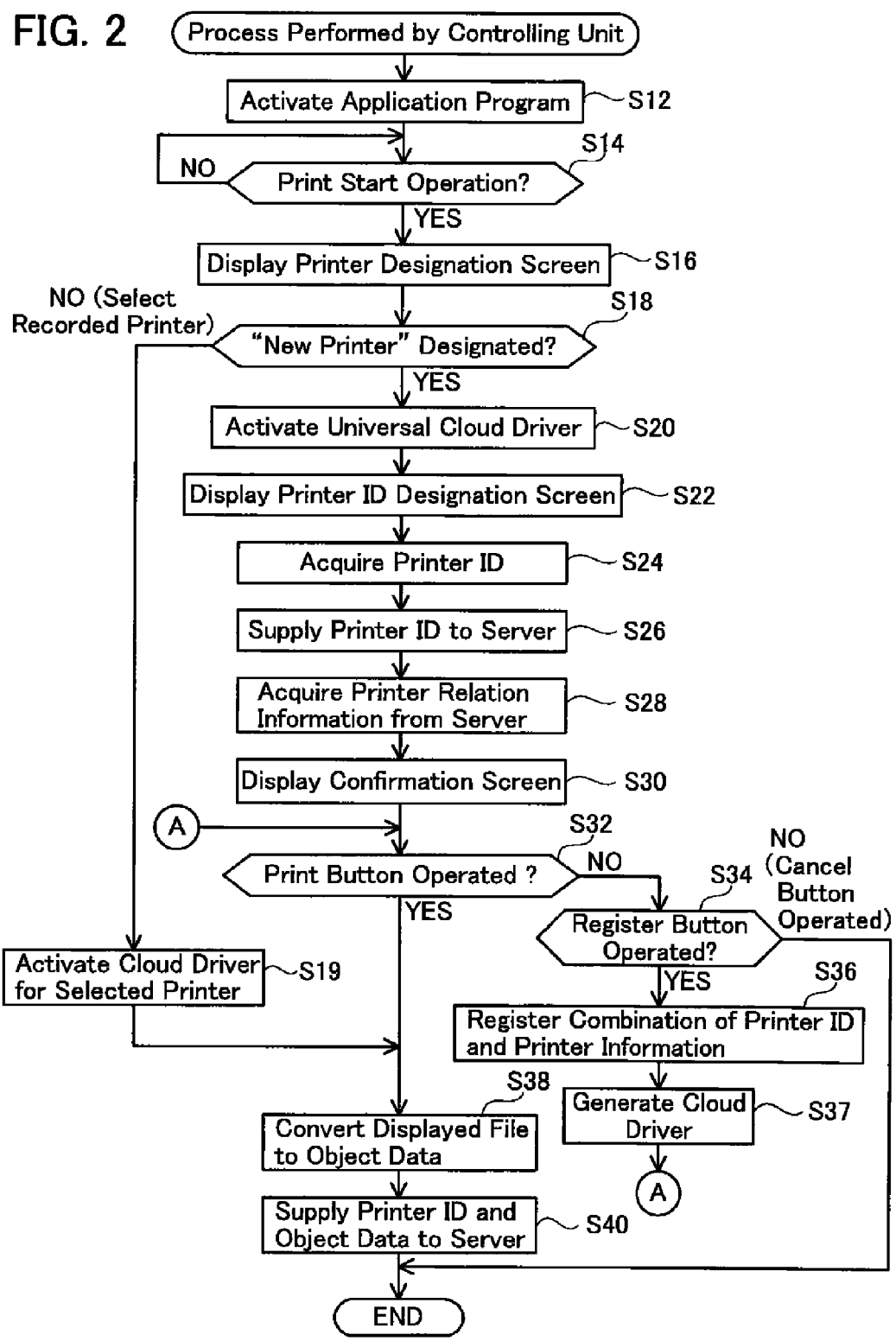
FIG. 2 illustrates a flow chart of processes performed by a PC.
Figure 3:
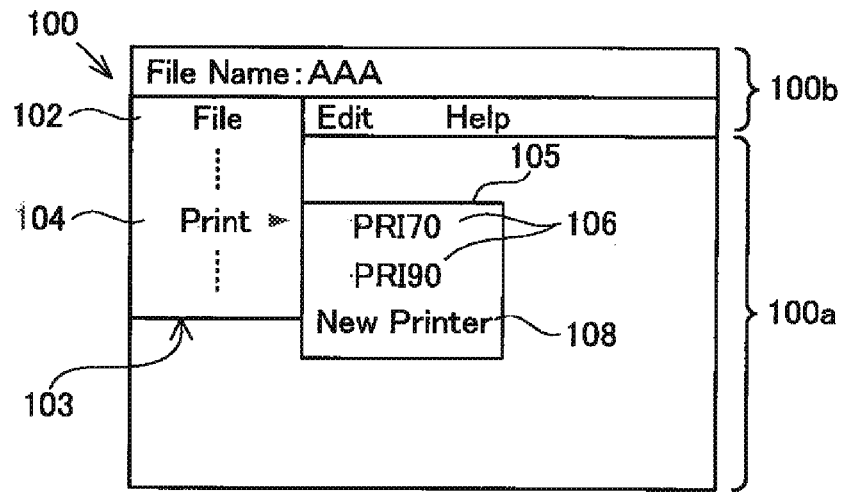
FIG. 3 illustrates an example of a printer selection screen.

As illustrated in FIG. 2, the controlling unit 30 monitors whether the print start operation is performed by the user (S14). If the print start operation is performed (YES in S14), the controlling unit 30 causes the displaying unit 14 to display a printer designation screen 105 (S16) shown in FIG. 3 in accordance with the application program 22. The printer designation screen 105 includes character strings 106 indicating one or more printer names 28 (i.e., "PRI70", "PRI90") registered in the printer registering table 26 and character strings 108 of "new printer". The user can perform a printer designation operation for designating the character string 106 indicating one printer name in the printer designation screen 105 or the character string 108 indicating "new printer".

As illustrated in FIG. 2, the controlling unit 30 monitors whether the printer designation operation is performed by the user (S18). The controlling unit 30 determines YES in S18 if the user selects the character string 108 indicating "new printer". The controlling unit 30 determines NO in S18 if the user selects the character string 106 indicating one printer name (e.g., "PRI70") from one or more printer names 28 registered in the printer registering table 26. The controlling unit 30 proceeds to 520 if YES in S18, and to S19 if NO in S18.

Figure 4:
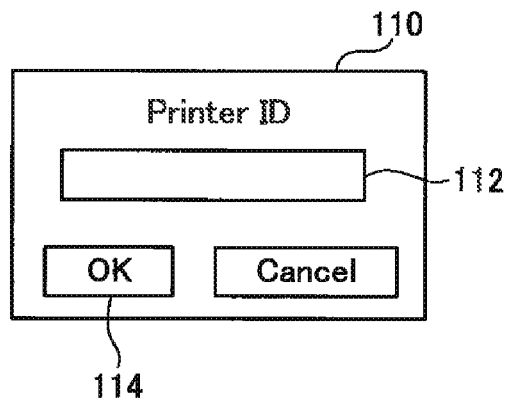
FIG. 4 illustrates an example of a printer ID designation screen.

In S19, the controlling unit 30 activates the dedicated cloud driver of the printer selected by the user and proceeds to S38. While a detailed description will be given later, the dedicated cloud driver activated in S19 is generated in S37. In S20, the controlling unit 30 activates the universal cloud driver 24 and proceeds to S22. The controlling unit 30 performs the processes of S22 to S40 in accordance with the universal cloud driver 24. In S22, the display controlling module 32 causes the displaying unit 14 to display a printer ID designation screen 110 as illustrated in FIG. 4 (S22). By operating the operating unit 12, the user can input a printer ID in a field 112 of the printer ID designation screen 110. In addition, by operating the operating unit 12 after designating the printer ID, the user can operate an OK button 114. Moreover, for example, the printer ID may be adhered to a casing of a printer, and the user may input the printer ID by looking at the printer ID adhered to the printer by which the user desires to perform print.

As illustrated in FIG. 2, when the OK button 114 is operated by the user, the identification information acquiring module 34 acquires the printer ID designated by the user (S24). The identification information acquiring module 34 acquires the printer ID inputted in the field 112 when the OK button 114 is operated. Next, the relation information acquiring module 38 supplies the printer ID acquired in S24 to the server 50 (S26).

As illustrated in FIG. 6, upon acquiring the printer ID 204 supplied from the PC 10 in S26 in FIG. 2, the server 50 supplies to the PC 10 printer relation information 206 (model information, printer name information, and location information) stored in the memory of the server 50 in association with the printer ID 204.

Figure 5:
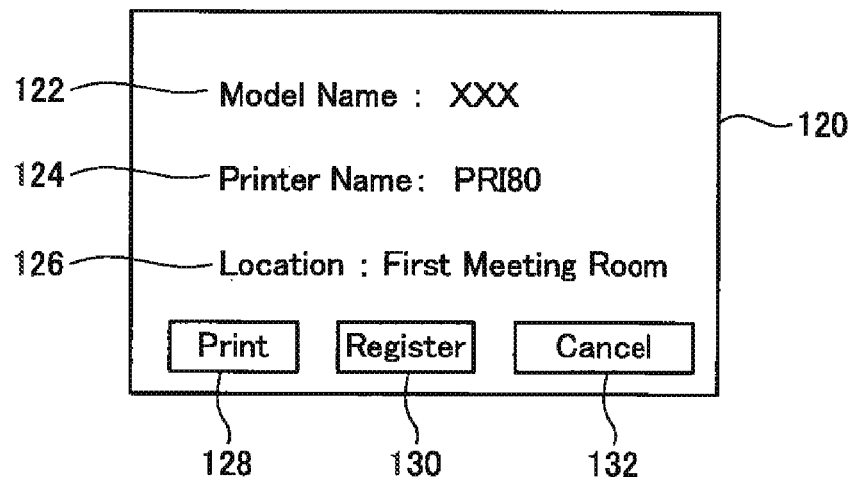
FIG. 5 illustrates an example of a confirmation screen.

As illustrated in FIG. 2, the relation information acquiring module 38 acquires the printer relation information 206 from the server 50 (S28). Next, as illustrated in FIG. 5, the display controlling module 32 causes the displaying unit 14 to display a confirmation screen 120 (S30).

In the confirmation screen 120 are displayed character strings corresponding to types of information contained in the printer relation information 206 acquired in S28. That is, a character string 122 corresponding to the model information, a character string 124 corresponding to the printer name information, and a character string 126 corresponding to the location information are displayed in the confirmation screen 120. By viewing the confirmation screen 120 displayed on the displaying unit 14, the user can confirm a printer corresponding to the printer ID inputted in the field 112 shown in FIG. 4. The confirmation screen 120 further includes three buttons, namely, a [print] button 128, a [register] button 130, and a [cancel] button 132.

The controlling unit 30 monitors whether any button of the above three buttons 128 to 132 is operated by the user. As illustrated in FIG. 2, the controlling unit 30 monitors whether or not the [print] button 128 is operated by the user (S32). If NO in S32, the process proceeds to S34. In 534, the controlling unit 30 monitors whether or not the [register] button 130 is operated by the user. If NO in S34, that means the [cancel] button 132 is operated by the user, the display controlling module 32 closes the confirmation screen 120 displayed on the display unit 14 and terminates the process.

If YES in S34, that means, the [register] button 130 is operated by the user, the registering module 40 registers a combination of the printer ID acquired in S24 and the printer name information among the printer relation information acquired in S28 in the printer registering table 26 (S36). Next, the registering module 40 generates a dedicated cloud driver for the printer registered in S36 (S37). The cloud driver generated in S37 is hereinafter referred to as a "specific cloud driver". The specific cloud driver is activated in S19 described above if the printer registered in S36 is selected. By performing an operation in accordance with the specific cloud driver, the controlling unit 30 can identify the printer ID registered in the printer registering table 26 in combination with the printer name (e.g., "PRI70") designated in S18. Therefore, the controlling unit 30 need not perform the processes of S22 to S30. After the process of S37 is completed, the controlling unit 30 returns to S32. Moreover, when the processes of S36 and S37 are being performed, the display controlling module 32 maintains a state where the confirmation screen 120 is displayed on the displaying unit 14.

On the other hand, if YES in S32, that means the [print] button 128 is operated by the user, the supplying module 36 converts data of the file AAA displayed on the displaying unit 14 into the aforementioned target data (e.g., the object data) in response to a render instruction received from the application program 22. When the process of S19 is performed (i.e., when the character string 106 indicating a printer already registered in the printer registering table 26 is designated in S18), in S38 the supplying module 36 converts the data of the file AAA into target data (e.g., object data) in accordance with the dedicated cloud driver of the printer activated in S19. On the other hand, when the processes of S20 to S32 are performed (i.e., when the character string 108 indicating the "new printer" is designated in S18), in S38 the supplying module 36 converts the data of the file AAA into target data (e.g., object data) in accordance with the universal cloud driver 24 activated in S20.

The process of S40 differs in content thereof between a case where the process of S19 is performed and a case where the processes of S20 to S32 are performed. When the process of S19 is performed, in S40 the supplying module 36 sends to the server 50 the printer ID registered in the printer registering table 26 in combination with the printer name (e.g., "PRI70") designated in S18 and the target data generated in S38 in accordance with the dedicated cloud driver of the printer activated in S19. On the other hand, when S20 to S32 are performed, in S40 the supplying module 36 sends to the server 50 the printer ID acquired in S24 and the target data generated in S38 in accordance with the universal cloud driver 24 activated in S20.

As illustrated in FIG. 6, the server 50 acquires the printer ID and the target data 208 supplied from the PC 10 in 540. As described above, the memory of the server 50 stores, for each of the printers 70, 80 and 90, the printer ID and data format information in combination with each other. The data format information may indicate a data format that the printer is capable of interpreting. The server 50 first identifies data format information associated with the printer ID acquired from the PC 10. The server 50 then converts the target data 208 acquired from the PC 10 into print data having a data format indicated by the data format information (S210). Next, the server 50 stores a combination the generated print data and the printer ID in the memory of the server 50.

Each of the printers 70, 80, and 90 periodically inquires the server 50 as to whether or not data to be processed by the printer is stored in the server 50 (polling 212). The polling 212 includes a printer ID of a printer that is a sending source of the polling 212. Upon receiving the polling 212, the server 50 determines whether or not print data combined with the printer ID included in the polling 212 is stored in the memory of the server 50. When a positive result is obtained by the aforementioned determination process, the server 50 supplies information 214 indicating "job available" as a response to the polling 212 to the printer which is the sending source of the polling 212. In addition, when a negative result is obtained by the determination process, the server 50 supplies information indicating "job not available" as a response to the polling 212 to the printer that is the sending source of the polling 212.

Upon acquiring information 214 indicating "job available", the printer which is the sending source of the polling 212 supplies a job request 216 including the printer's own printer ID to the server 50. On the other hand, upon acquiring information indicating "job not available", the printer which is the sending source of the polling 212 does not supply a job request 216 to the server 50.

Upon acquiring the job request 216, the server 50 supplies print data 218 (i.e., the print data generated in S210) associated with the printer ID included in the job request 216 to the printer which is the sending source of the job request 216. Accordingly, the printer which is the sending source of the job request 216 prints an image represented by the print data 218 (i.e., an image represented by the file AAA illustrated in FIG. 3) on a print medium (S220).

The present embodiment has been described in detail. When the user performs the print start operation (i.e., the menu selection operation and the item selection operation) and the printer designation operation in accordance with the application program 22, the PC 10 supplies target data (e.g., object data) to the server 50 in accordance with the universal cloud driver 24 (refer to S40 in FIG. 2). According to the configuration described above, by performing a familiar operation for print (i.e., the print start operation) and subsequently performing an operation according to a screen displayed on the display unit 14, the user can have a printer perform printing of the file AAA performed by the application program 22 (i.e., the file AAA displayed on the displaying unit 14).

The server 50 converts the target data supplied from the PC 10 into print data having the format which can be interpreted by the printer identified by the printer ID supplied from the PC 10 (S210 in FIG. 6). Therefore, the PC 10 need not perform the conversion into print data having the format that the printer is capable of interpreting. That is, the PC 10 need not have a driver program for converting the file AAA, that is the print target, into the final print data.

In addition, the PC 10 converts the file AAA into the target data (S38) and supplies the target data to the server 50 (S40). Therefore, the server 50 need not have an application program corresponding to the file AAA necessary for converting the file AAA into the target data.

The PC 10 registers in the printer registering table 26 the combination of the printer ID and the printer relation information (S36). When a printer name of a registered printer is designated in S18, the PC 10 does not display the printer ID designation screen 110. The PC 10 supplies the printer ID registered in the printer registering table 26 in combination with the designated printer name to the server 50 (S50). According to the configuration described above, the user is not required to designate a printer ID when printing is to be performed by a printer already registered in the printer registering table 26.

In addition, when a printer name of the registered printer is designated in S18, the PC 10 does not acquire printer information from the server 50 and does not display the confirmation screen 120. Accordingly, the period of time from the designation of a printer name by the user to the supplying of print data from the PC 10 to the server 50 can be reduced.

When the print start operation is performed by the user (YES in S14), the PC 10 converts the file AAA currently being performed by the application program 22 into the target data (S38) and supplies the target data to the server 50 (S40). Therefore, the user is not required to designate the print target file.

If the printer ID acquired in S24 is supplied to the server 50 (S26), the confirmation screen 120 is displayed on the displaying unit 14 (S30) before the target data is sent to the server 50. According to the configuration described above, the user may confirm the printer relation information 206 before the printer ID and the target data are supplied to the server 50.

Moreover, PC 10 is an example of the "terminal device". The printer ID is an example of the "printer identification information". The file AAA is an example of the "first file" and the "second file". The print start operation and the operation for selecting the character string 108 indicating a "new printer" among the printer designation operation are examples of the "first operation". The operation of the [print] button 128 on the confirmation screen 120 by the user is an example of the "second operation", and the operation of the [register] button 130 on the confirmation screen 120 by the user is an example of the "third operation". The print start operation and the operation for selecting the character string 106 indicating a registered printer name among the printer designation operation are examples of the "fourth operation". The printer name information among printer information acquired from the server 50 is an example of the "specific printer relation information".

(Modifications)

(1) The confirmation screen 120 need not include the [print] button 128. For example, instead of the [print] button 128, the confirmation screen 120 may include a [confirm] button which can be operated by the user. In this case, when the user operates the [confirm] button, the PC 10 may cause the displaying unit 14 to display a print instruction screen including a character string which inquires the user for permission to print and a [OK] button which can be operated by the user. When the user operates the [OK] button on the print instruction screen, the PC 10 may perform the processes of S38 and S40 in FIG. 2. In the present modification, the operation of the [OK] button on the print instruction screen by the user is an example of the "second operation".

Similarly, the confirmation screen 120 need not include the [register] button 130. In this case, instead of the [register] button 130, the confirmation screen 120 may include a [confirm] button which can be operated by the user. In this case, when the user operates the [confirm] button, the PC 10 may cause the displaying unit 14 to display a registration instruction screen including a character string which inquires the user for permission to register and a registration instruction screen including a [OK] button which can be operated by the user. When the user operates the [OK] button on the registration instruction screen, the PC 10 may perform the process of S36 in FIG. 2. In the present modification, the operation of the [OK] button on the registration instruction screen by the user is an example of the "third operation".

(2) The PC 10 may supply the file AAA to the server 50 instead of converting into the target data. The server 50 may have a program for converting the file AAA into print data. In the present modification, the file AAA is an example of the "first file", the "second file", the "first target data", and the "second target data".

(3) The PC 10 may perform the processes of S38 and S40 on files other than the file currently being displayed on the displaying unit 14. For example, when the user performs the print start operation (S14) in a state where the application program 22 is being performed but no files are opened, the PC 10 may display a list of files which can be performed by the application program 22 on the displaying unit 14. The PC 10 may further allow the user to select a specific file from the files in the list. The PC 10 may perform the processes of S38 and S40 on a file designated by the user.

(4) The PC 10 may be configured to supply only the target data to the server 50 in S40. In this case, the server 50 may supply print data to the printer identified by the printer ID supplied from the PC 10 in S24.

(5) The printer relation information may be information of one or two types among the three types of information described above. Alternatively, the printer information may include information other than the three types of information described above (e.g., an IP address of a printer).

(6) The printer relation information registered in S36 may be the entire printer relation information acquired from the server 50 in S28, or may be location information. The entire printer relation information acquired from the server 50 in S28 may be registered in the printer registering table 26 and, instead of the character strings 106 indicating the printer names, all printer relation information i.e., a printer name, a location, and a model name may be displayed. In this manner, by displaying all printer relation information when performing the print start operation, the user can select a printer based on more reliable information as to which printer can be selected without having to display the confirmation screen 120.

(7) For registering the printer ID and the printer name information in the printer registering table 26, the user may input the printer ID and the printer name information into the PC 10 by operating the operating unit 12. When the printer ID and the printer name information are inputted by the user, the registering module 40 may register the printer ID and printer name information. In the present modification, the printer ID and the printer name information can be registered without communication between the PC 10 and the server 50.

(8) The art according to the present embodiment can be applied not only to the PC 10 but also to other terminal devices such as a PDA, a mobile phone, a smart phone and a tablet device.

(9) Instead of generating a dedicated cloud driver for each registered printer, when the print start operation is performed in S14, the controlling unit 30 may cause the display unit 14 to display the printer designation screen 105 (S16) and activate the universal cloud driver 24. In addition, in S18 the controlling unit 30 may monitor whether the user performs a printer designation operation in accordance with the universal cloud driver 24.

(10) In the foregoing embodiment, each of modules 32 to 40 are functioned as a result of the controlling unit 30 performing the processes according to the universal cloud driver 24. Nevertheless, at least one of the modules 32 to 40 may alternately be functioned by a hardware resource such as a logic circuit.

(11) The server 50 may not convert the target data 208 acquired from the PC 10 in a case where the target data 208 acquired from the PC 10 have already had a data format indicated by the data format information. In the present modification, the target data 208 acquired from the PC 10 is an example of the "first target data" and the "first print data".

The invention claimed is:

1. A computer readable device storing instructions configured to be executed by a control unit of a terminal device, the instructions, when executed by the control unit, cause the control unit to function as:
   a display controlling module configured to cause, upon a first operation on a first file prepared for an application software installed in the terminal device, a display device to display an identification information designation screen for designating printer identification information so as to identify a printer to perform printing for the first file, the first operation including a print start operation for designating the printer;
   an identification information acquiring module configured to acquire the printer identification information designated via the identification information designation screen;
   a supplying module configured to supply the printer identification information and first target data for the first file to a server; and
   a registering module configured to register to a memory of the terminal device the printer identification information and printer relation information related to the printer, the printer identification information being associated with the printer relation information,
   wherein, upon a fourth operation on a second file prepared for the application software, for selecting the registered printer relation information, the fourth operation including the print start operation identical with the printer start operation included in the first operation, such that:
      the display controlling module is configured not to cause the display device to display the identification information designating screen, and
      the supplying module is configured to supply to the server the printer identification information registered in the memory of the terminal device and associated with the selected registered printer relation information and second target data.

2. The computer readable device as in claim 1, wherein the instructions, when executed by the control unit, cause the control unit to further function as:
   a relation information acquiring module configured to supply the printer identification information to the server and to acquire from the server the printer relation information related to the printer identified by the printer identification information,
   wherein the display controlling module is further configured to cause the display device to display a confirmation screen indicating the acquired printer relation information, and
   upon a second operation after displaying the confirmation screen, the supplying module supplies to the server the printer identification information and the first target data.

3. The computer readable device as in claim 2, wherein the registering module is configured to register the printer identification information and the acquired printer relation information associated with the printer identification information to the memory of the terminal device upon a third operation after displaying the confirmation screen.

4. The computer readable device as in claim 2, wherein upon the fourth operation,
   the relation information acquiring module is configured not to acquire any printer relation information from the server,
   the display controlling module is configured not to cause the display device to display the confirmation screen, and
   the supplying module is configured to supply the printer identification information and the second target data to the server.

5. The computer readable device as in claim 1, wherein the display control module is configured to display the first file on the displaying unit at the first operation.

6. A terminal device comprising:
a memory;
a control unit;
a storage unit for storing instructions to be executed by the control unit; and
an interface unit configured to be connected with a server via the Internet, wherein the instructions, when executed by the control unit, cause the control unit to function as:
a display controlling module configured to cause, upon a first operation on a first file prepared for an application software installed in the terminal device, a display device to display an identification information designation screen for designating printer identification information so as to identify a printer to perform printing for the first file, the first operation including a print start operation for designating the printer;
an identification information acquiring module configured to acquire the printer identification information designated via the identification information designation screen;
a supplying module configured to supply the printer identification information and first target data for the first file to the server; and
a registering module configured to register to the memory of the terminal device the printer identification information and printer relation information related to the printer, the printer identification information being associated with the printer relation information,
wherein, upon a fourth operation on a second file prepared for the application software, for selecting the registered printer relation information, the fourth operation including the print start operation identical with the printer start operation included in the first operation, such that:
the display controlling module is configured not to cause the display device to display the identification information designating screen, and
the supplying module is configured to supply to the server the printer identification information registered in the memory of the terminal device and associated with the selected registered printer relation information and second target data.

7. A method for executing a control unit of a terminal device, the method comprising:
a display controlling step for causing, upon a first operation on a first file prepared for an application software installed in the terminal device, a display device to display an identification information designation screen for designating printer identification information so as to identify a printer to perform printing for the first file, the first operation including a print start operation for designating the printer;
an identification information acquiring step for acquiring the printer identification information designated via the identification information designation screen;
a supplying step for supplying the printer identification information and first target data for the first file to a server; and
a registering step for registering to a memory of the terminal device the printer identification information and printer relation information related to the printer, the printer identification information being associated with the printer relation information,
wherein, upon a fourth operation on a second file prepared for the application software, for selecting the registered printer relation information, the fourth operation including the print start operation identical with the printer start operation included in the first operation, such that:
the display controlling step does not cause the display device to display the identification information designation screen, and
the supplying step supplies to the server the printer identification information registered in the memory of the terminal device and associated with the selected registered printer relation information and second target data.

8. The method as in claim 7, further comprising:
a relation information acquiring step for supplying the printer identification information to the server and for acquiring from the server printer relation information related to the printer identified by the printer identification information,
wherein the display controlling step further causes the display device to display a confirmation screen indicating the acquired printer relation information, and
upon a second operation after displaying the confirmation screen, the supplying step supplies to the server the printer identification information and the first target data.

9. The method as in claim 8, wherein
the registering step registers the printer identification information and the acquired printer relation information associated with the printer identification information to the memory of the terminal device upon a third operation after displaying the confirmation screen.

10. The method as in claim 8, wherein upon the fourth operation,
the relation information acquiring step does not acquire any printer relation information from the server,
the display controlling step does not cause the display device to display the confirmation screen, and
the supplying step supplies the printer identification information and the second target data to the server.

11. The method as in claim 7, wherein
the display control step displays the first file on the displaying unit at the first operation.

12. A system comprising:
a terminal device;
a printer;
a server configured be connected with the terminal device and the printer via the Internet, wherein
the terminal device comprises:
a memory;
a control unit;
a storage unit for storing instructions to be executed by the control unit; and
an interface unit configured to be connected with a server via the Internet, wherein the instructions, when executed by the control unit, cause the control unit to function as:
a display controlling module configured to cause, upon a first operation on a first file prepared for an application software installed in the terminal device, a display device to display an identification information designation screen for designating printer identification information so as to identify a printer to perform printing for the first file, the first operation including a print start operation for designating the printer;
an identification information acquiring module configured to acquire the printer identification information designated via the identification information designation screen;

a supplying module configured to supply the printer identification information and target data for the first file to the server; and a registering module configured to register to a memory of the terminal device the printer identification information and printer relation information related to the printer, the printer identification information being associated with the printer relation information, wherein, upon a fourth operation on a second file prepared for the application software, for selecting the registered printer relation information, the fourth operation including the print start operation identical with the printer start operation included in the first operation, such that:

the display controlling module is configured not to cause the display device to display the identification information designating screen, and the supplying module is configured to supply to the server the printer identification information registered in the memory of the terminal device and associated with the selected registered printer relation information and second target data;

the server comprises:

a sending unit configured to send print data according to the target data to the printer, and the printer comprises:

a printing device configured to print an image represented by the print data.

13. The computer readable device as in claim 3, wherein upon the second operation after the third operation, the supplying module supplies to the server the printer identification information and the first target data after registering the printer identification information and the acquired printer relation information, and upon the second operation without the third operation after displaying the confirmation screen, the supplying module supplies to the server the printer identification information and the first target data without registering the printer identification information and the acquired printer relation information.

14. The computer readable device as in claim 1, wherein the memory of the terminal device stores a universal cloud driver, which is a driver configured to convert a file into target data in a format that is interpretable by the server and configured to supply the printer identification information and the target data to the server, the registering module is configured to generate a dedicated cloud driver for the printer identified by the printer identification information registered to the memory of the terminal device, the dedicated cloud driver being a driver configured to convert the second file into the second target data in a format that is interpretable by the server and configured to supply the registered printer identification information and the second target data to the server, upon the fourth operation on the second file prepared for the application software, for selecting the registered printer relation information, the supplying module is configured to activate the dedicated cloud driver and to not activate the universal print driver, and upon the first operation on the first file prepared for the application software, the identification information acquiring module is configured to activate the universal cloud driver and to not activate the dedicated print driver.

* * * * *